(12) United States Patent
Martin et al.

(10) Patent No.: US 12,017,609 B2
(45) Date of Patent: Jun. 25, 2024

(54) FUNCTIONALITY LIMITING SYSTEM FOR A MOTORIZED VEHICLE AND METHOD FOR LIMITING THE FUNCTIONALITY OF A MOTORIZED VEHICLE

(71) Applicant: VOLVO TRUCK CORPORATION, Gothenburg (SE)

(72) Inventors: Patrick Martin, Beauvoir de Marc (FR); Thomas Partarrieu, Dardilly (FR); Cedric Mazaufroy, Béligneux (FR); Philemon Chavrier, Lyons (FR)

(73) Assignee: VOLVO TRUCK CORPORATION, Gothenburg (SE)

( * ) Notice: Subject to any disclaimer, the term of this patent is extended or adjusted under 35 U.S.C. 154(b) by 414 days.

(21) Appl. No.: 17/594,892

(22) PCT Filed: May 17, 2019

(86) PCT No.: PCT/EP2019/062785
§ 371 (c)(1),
(2) Date: Nov. 2, 2021

(87) PCT Pub. No.: WO2020/233769
PCT Pub. Date: Nov. 26, 2020

(65) Prior Publication Data
US 2022/0203932 A1 Jun. 30, 2022

(51) Int. Cl.
*B60R 25/34* (2013.01)
*B60R 22/48* (2006.01)
(Continued)

(52) U.S. Cl.
CPC ............. *B60R 25/04* (2013.01); *B60R 22/48* (2013.01); *B60R 25/23* (2013.01); *B60R 25/241* (2013.01);
(Continued)

(58) Field of Classification Search
CPC ....... B60R 25/252; B60R 25/34; B60R 25/31; B60R 25/241; B60R 22/48; B60R 25/04;
(Continued)

(56) References Cited

U.S. PATENT DOCUMENTS 3,964,620 A * 6/1976 Parsons ................. B65G 67/04
141/95
6,060,981 A 5/2000 Landes
(Continued)

FOREIGN PATENT DOCUMENTS

EP 1712437 A2 10/2006
WO 0194778 A1 12/2001

OTHER PUBLICATIONS

Vijay et al., Electronic control unit for an adaptive cruise control system & engine management system in a vehicle using electronic fuel injection, 2010, IEEE, p. 143-146 (Year: 2010).*
(Continued)

*Primary Examiner* — McDieunel Marc
(74) *Attorney, Agent, or Firm* — Venable LLP; Jeffri A. Kaminski

(57) ABSTRACT

The invention relates to a functionality limiting system (110) for a motorized vehicle (100) provided with a motion system, comprising: first sensor means (101) adapted to sense if the power is on and providing a first sensing signal; second sensor means (102a-102d) adapted to sense one or several operational parameters relative to at least one part of the vehicle (100) and providing a second sensing signal; deactivation means (103) adapted to verify if a deactivation condition is met and providing a deactivation signal; a control unit (104) in communication with the first and second sensor means (101; 102a-102d) and the deactivation means (103), the control unit (104) receiving said first and second sensing signals and said deactivation signal, the control unit (104) being adapted to control the speed and/or
(Continued)

the power supplied by the motion system in response to said first and second sensing signals and said deactivation signal, in such a manner that said speed and/or said power is limited in an activated mode of the system and is not limited in a deactivated mode of the system.

31 Claims, 3 Drawing Sheets

(51) Int. Cl.
  *B60R 25/04* (2013.01)
  *B60R 25/23* (2013.01)
  *B60R 25/24* (2013.01)
  *B60R 25/25* (2013.01)
  *B60R 25/31* (2013.01)

(52) U.S. Cl.
  CPC ............ *B60R 25/25* (2013.01); *B60R 25/252* (2013.01); *B60R 25/31* (2013.01); *B60R 25/34* (2013.01); *B60R 2022/4883* (2013.01)

(58) Field of Classification Search
  CPC .. B60R 25/23; B60R 25/25; B60R 2022/4883
  See application file for complete search history.

(56) References Cited

U.S. PATENT DOCUMENTS

| | | | |
|---|---|---|---|
| 6,232,874 B1 | 5/2001 | Murphy | |
| 6,845,324 B2* | 1/2005 | Smith | G08B 27/006 |
| | | | 702/3 |
| 7,307,574 B2* | 12/2007 | Kortum | G08C 17/02 |
| | | | 348/14.05 |
| 7,847,708 B1* | 12/2010 | Jones | G08G 1/0967 |
| | | | 340/905 |
| 8,599,013 B1* | 12/2013 | Baron, Sr. | G08B 27/005 |
| | | | 340/995.14 |
| 9,421,945 B1 | 8/2016 | Smathers | |
| 9,855,887 B1* | 1/2018 | Potter | F21S 41/675 |
| 10,897,442 B2* | 1/2021 | Presley | G06F 40/284 |
| 11,112,267 B2* | 9/2021 | Rothschild | B60K 31/185 |
| 11,228,869 B2* | 1/2022 | Moustafa | H04L 12/1845 |
| 11,696,685 B2* | 7/2023 | Wu | A61B 5/4872 |
| | | | 600/410 |
| 2006/0025897 A1* | 2/2006 | Shostak | G06K 19/0717 |
| | | | 701/1 |
| 2023/0309144 A1* | 9/2023 | Zhu | H04W 74/0808 |
| 2023/0328683 A1* | 10/2023 | Zhang | H04W 64/00 |
| | | | 455/456.1 |

OTHER PUBLICATIONS

Schmutzler et al., On demand dependent deactivation of automotive ECUs, 2012, IEEE, p. 1-6 (Year: 2012).*

Chen et al., Fault detection and confirmation for hybrid electric vehicle, 2014, IEEE, p. 1-6 (Year: 2014).*

Sheta et al., Path accumulation and ego-motion compensation for target path following and situational awareness, 2017, IEEE, p. 126-133 (Year: 2017).*

International Search Report and Written Opinion dated Feb. 11, 2020 in corresponding International PCT Application No. PCT/EP2019/062785, 9 pages.

* cited by examiner

FUNCTIONALITY LIMITING SYSTEM FOR A MOTORIZED VEHICLE AND METHOD FOR LIMITING THE FUNCTIONALITY OF A MOTORIZED VEHICLE

CROSS-REFERENCE TO RELATED APPLICATIONS

This application is a U.S. National Stage application of PCT/EP2019/062785, filed May 17, 2021, and published on Nov. 26, 2020, as WO 2020/233769 A1, all of which is hereby incorporated by reference in its entirety.

TECHNICAL FIELD

The invention relates to a functionality limiting system for a motorized vehicle and a method for limiting the functionality of a motorized vehicle.

Although the invention will be described in detail with respect to a truck, the invention is not restricted to this particular motorized vehicle, but may also be used in other motorized vehicles such as a bus, or a construction equipment or any vehicle provided with a motion system, such as an electric or thermic engine, or a hydrostatic drive.

BACKGROUND

In the prior art, it is well known to prevent the use of a vehicle by a non-authorized user by equipping said vehicle with an anti-theft system that denies the entry to, and/or prevents the functioning of the vehicle if the user is not in possession of a specific key device and/or a specific ID card or badge. However, such anti-theft systems have the major drawback to be inefficient if said specific key device or said specific ID card or badge is stolen by a non-authorized user. Furthermore, if the authorized user wants to move out from the vehicle for any reasons, it must switch-off the engine to avoid the risk of a person starting the vehicle at his place.

Moreover, these known anti-theft systems are not adapted to permit the limited use of the vehicle by a non-authorized user when, for any safety reasons, the vehicle has to be moved at a short distance parking place or garage, and in the case where the authorized driver has left the vehicle without switching-off the engine.

SUMMARY

An object of the invention is to provide an anti-theft system for a motorized vehicle, which avoids the problems of the prior art, especially a system that limits the use of a motorized vehicle using only features from the vehicle in order to be self-activated hence requiring no action from the driver and with no bypass for the system on the driver's side.

According to a first aspect of the invention, the object is achieved by a functionality limiting system for a motorized vehicle provided with a motion system, comprising:
  first sensor means adapted to sense if the power is on and providing a first sensing signal;
  second sensor means adapted to sense one or several operational parameters relative to at least one part of the vehicle and providing a second sensing signal;
  deactivation means adapted to verify if a deactivation condition is met and providing a deactivation signal;
  a control unit in communication with the first and second sensor means and the deactivation means, the control unit receiving said first and second sensing signals and said deactivation signal, the control unit being adapted to control the speed and/or the power supplied by the motion system in response to said first and second sensing signals and said deactivation signal, in such a manner that said speed and/or said power is limited in an activated mode of the system and is not limited in a deactivated mode of the system.

Thus configured, the system of the present invention permits to determine when the authorized driver has left the vehicle based on the detection of specific operational parameters relative to the vehicle and allows the limited use of a vehicle by a non-authorized user in the case where the authorized driver has left the vehicle without switching-off the engine.

The system may also include one or more of the following features, taken alone or in combination.

According to one embodiment, the at least one part of the vehicle is a door of the vehicle, in particular the driver side door of the vehicle, the second sensor means sensing if said door is opened or closed.

According to a further embodiment, the at least one part of the vehicle is a seat of the vehicle, in particular the driver seat, the operational parameter sensed by the second sensor means being the pressure applied on the seat.

According to a further embodiment, the at least one part of the vehicle is a park brake of the vehicle, the second sensor means sensing if the park brake is applied or not.

According to a further embodiment, the at least one part of the vehicle is a seat belt of the vehicle, the second sensor means sensing if the seat belt is buckled or not.

According to a further embodiment, the deactivation means are adapted to verify that a predetermined security code is correctly typed on a keypad data entry device by a user.

According to a further embodiment, the deactivation means are adapted to verify that a predetermined security code is correctly written on a badge or ID card hold by a user.

According to a further embodiment, the deactivation means are adapted to verify that the facial features of a user correspond to predetermined facial features.

According to a further embodiment, the deactivation means are adapted to verify that the fingerprints of a user correspond to predetermined fingerprints.

According to a further embodiment, the control unit is adapted to sense the passage from the power is off to the power is on instantaneously, the system being then directly shifted in its activated mode.

According to a further embodiment, the control unit is adapted to time a predetermined delay period after the first sensor means sense that the power is on and the second sensor means sense that at least one operational parameter is different from a reference parameter, the system being shifted in its activated mode at the end of the predetermined delay period if, during the predetermined delay period, the second sensor means do not sense that all operational parameters change back to the reference parameter.

According to a further embodiment, the system is shifted to its deactivated mode after the predetermined delay period, if the second sensor means sense that all operational parameters change back to the reference parameter and the deactivation means verify that the deactivation condition is met.

According to a further embodiment, the predetermined delay period is between 0 and 120 seconds, preferably between 0 and 60 seconds, and, in particular, is equal to 10 seconds.

According to a further embodiment, the system is shifted in its activated mode at the end of a predetermined delay period after the first sensor means sense that the power is on and the second sensor means sense that the park brake of the vehicle is applied and the driver side door of the vehicle is opened.

According to a further embodiment, the system is shifted in its deactivated mode when the first sensor means sense that the power is on, the second sensor means sense that the park brake of the vehicle is not applied and the driver side door of the vehicle, as well as all other doors, is closed, and the deactivation means verify that a predetermined security code is correctly typed on a keypad data entry device by a user or written on a badge or ID card hold by a user or facial features of a user correspond to predetermined facial features or fingerprints of a user correspond to predetermined fingerprints.

According to a second aspect of the present invention, the object is achieved by a method for limiting the functionality of a motorized vehicle provided with a motion system, the method comprising the steps of:
 a) providing first sensor means adapted to sense if the power is on and providing a first sensing signal;
 b) providing second sensor means adapted to sense one or several operational parameters relative to at least one part of the vehicle and providing a second sensing signal;
 c) providing deactivation means adapted to verify if a deactivation condition is met and providing a deactivation signal;
 d) providing a control unit in communication with the first and second sensor means and the deactivation means, the control unit receiving said first and second sensing signals and said deactivation signal, the control unit being adapted to control the speed and/or the power supplied by the motion system in response to said first and second sensing signals and said deactivation signal;
 e) sensing, via the first sensor means, if the power is on and transmitting a first sensing signal to the control unit in response to said sensing;
 f) sensing, via the second sensor means, if one or several operational parameters relative to at least one part of the vehicle have been changed and transmitting a second sensing signal to the control unit in response to said sensing;
 g) verifying, via the deactivation means, if a deactivation condition is met and transmitting a deactivation signal to the control unit in response to said verification;
 h) controlling, via the control unit, the speed and/or power supplied by the motion system in response to said first and second sensing signals and said deactivation signal, in such a manner that said speed and/or said power is limited in a first mode and is not limited in a second mode.

The method may also include one or more of the following features, taken alone or in combination.

According to one embodiment, in step f), the second sensor means sense if at least one door of the vehicle, in particular the driver side door of the vehicle, is opened or closed.

According to a further embodiment, in step f), the second sensor means sense if a pressure is applied on the driving seat of the vehicle.

According to a further embodiment, in step f), the second sensor means sense if the park brake of the vehicle is applied or not.

According to a further embodiment, in step f), the second sensor means sense if a seat belt of the vehicle is buckled or not.

According to a further embodiment, in step g), the deactivation means verify that a predetermined security code is correctly typed on a keypad data entry device by a user.

According to a further embodiment, in step g), the deactivation means verify that a predetermined security code is correctly written on a badge or ID card hold by a user.

According to a further embodiment, in step g), the deactivation means verify that the facial features of a user correspond to predetermined facial features.

According to a further embodiment, in step g), the deactivation means verify that the fingerprints of a user correspond to predetermined fingerprints.

According to a further embodiment, in step h), when the control unit (104) senses the passage from the power is off to the power is on, the speed and/or the power supplied by the motion system is instantaneously limited.

According to a further embodiment, the control unit is adapted to time a predetermined delay period after the first sensor means sense that the power is on and the second sensor means sense that at least one operational parameter is different from a reference parameter, the first mode being activated at the end of the predetermined delay period if, during the predetermined delay period, the second sensor means do not sense that all operational parameters change back to the reference parameter.

According to a further embodiment, the first mode is shifted to the second mode after the predetermined delay period, if the second sensor means sense that all operational parameters change back to the reference parameter and the deactivation means verify that the deactivation condition is met.

According to a further embodiment, the predetermined delay period is between 0 and 120 seconds, preferably between 0 and 60 seconds, and, in particular, is equal to 10 seconds.

According to a further embodiment, the control unit limits the speed and/or power supplied by the motion system at the end of a predetermined delay period after the first sensor means sense that the power is on and the second sensor means sense that the park brake of the vehicle is applied and the driver side door of the vehicle is opened.

According to a further embodiment, the control unit cancels the limitation of the speed and/or power supplied by the motion system when the first sensor means sense that the power is on, the second sensor means sense that the park brake of the vehicle is not applied and the driver side door of the vehicle, as well as all other doors, is closed, and the deactivation means verify that a predetermined security code is correctly written on a badge or ID card hold by a user.

The invention further relates to a vehicle comprising a functionality limiting system according to the present invention, the vehicle being preferably a truck.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
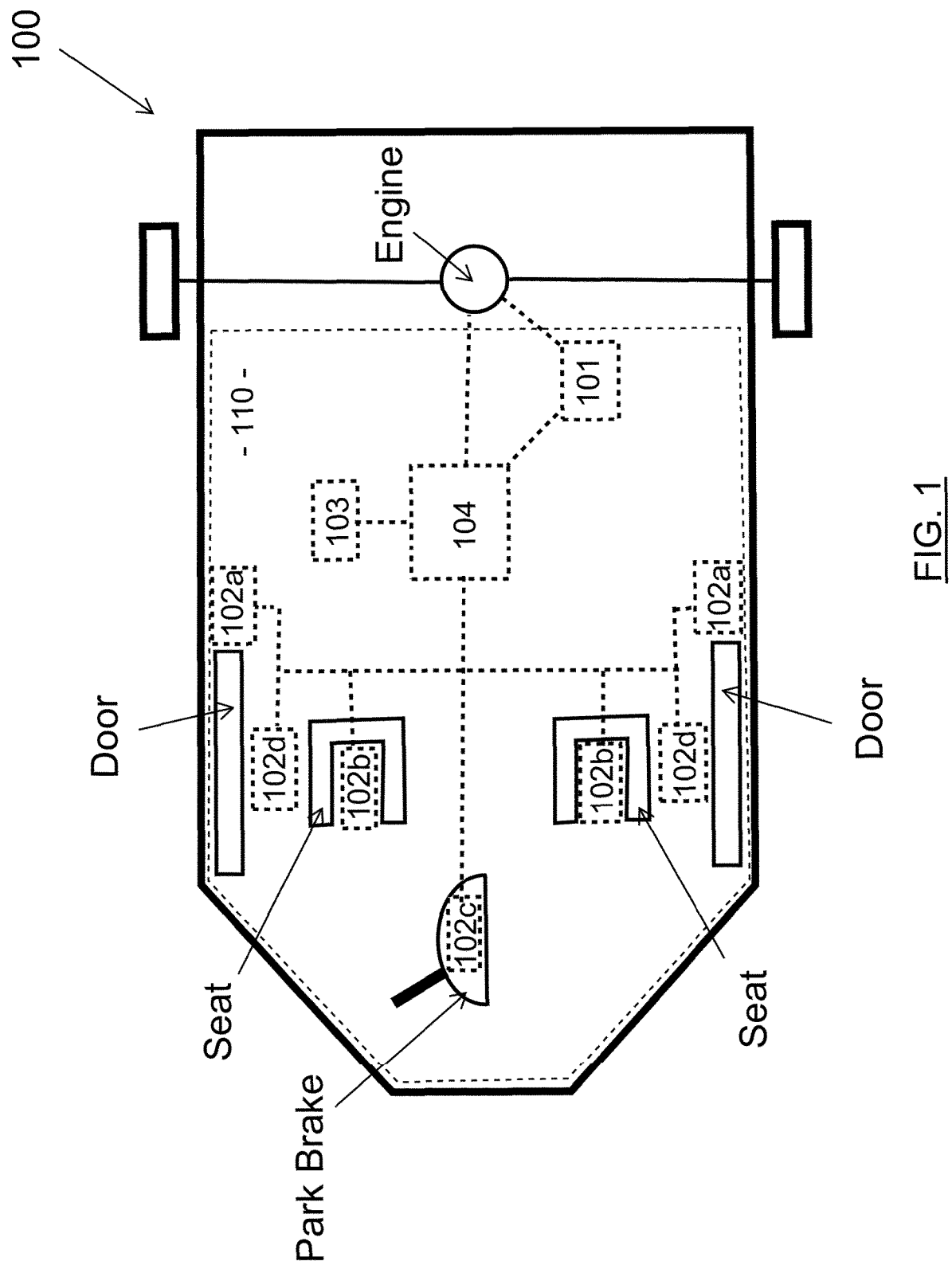
FIG. 1 is a schematic illustration of a truck equipped with the functionality limiting system of the present invention.

FIG. 1 illustrates a truck 100 provided with a functionality limiting system 110 according to the present invention. The truck 100 is driven by an engine and includes a cab at the front part thereof housing the driver and the passenger(s). The cab comprises two side doors at its left and right sides, two seats, a park brake between the two seats and a seat belt for each seat. The system 110 comprises a plurality of sensors 102a-102d located inside and/or outside of the truck 100, and adapted to sense specific operational parameters relative to specific parts of the truck 100. In particular, specific sensors 102a are adapted to sense if the doors of the truck are opened or closed. Specific sensors 102b are adapted to sense the pressure applied on the seats of the truck 100. A specific sensor 102c is adapted to sense if the park brake is applied or not. Finally, specific sensors 102d are adapted to sense if the seat belts are buckled or not. Furthermore, a specific sensor 101 is adapted to sense if the power is on.

The system 110 further comprises a control unit 104 that is in communication with the plurality of sensors 101 and 102a-102d, the control unit 104 receiving sensing signals transmitted by the plurality of sensors 101 and 102a-102d. The sensing signals can be analysed by the control unit 104 to determine if the authorized driver or other authorized person has left the truck 100 without switching-off the engine. In particular, when the authorized driver leaves the vehicle, the seat belt at the driver's side is not buckled, the pressure on the driver seat is null, the park brake is applied and the door at the driver's side is opened. Thus, such a case is easily detected by the sensors 102a-102d and corresponding sensing signals are transmitted to the control unit 104. The control unit 104 further receives a sensing signal from the sensor 101 informing it that the power is on.

The system 110 further comprises a deactivation unit 103 that is adapted to verify if a deactivation condition is met. Said deactivation unit 103 is in communication with the control unit 104 and is adapted to transmit a deactivation signal to the control unit 104 in response to said verification. In particular, the deactivation unit 103 may be configured to verify that a predetermined security code is correctly typed on a keypad data entry device by a user or is correctly written on a badge or ID card hold by a user. A keypad data entry device may be, for example, one or several buttons of a phone keypad, of a computer keypad or of a key used by the user to open the doors of the vehicle. The deactivation unit 103 may also be configured to verify that the facial features of a user correspond to predetermined facial features or that the fingerprints of a user correspond to predetermined fingerprints.

In response to the sensing signals transmitted by the sensors 101, 102a-102d and the deactivation signal transmitted by the deactivation unit 103, the control unit 104 is adapted to control the speed and/or the power supplied by the engine to switch the system 110 between a first mode, called activated mode, in which the speed and/or the power supplied by the engine is limited, and a second mode, called deactivated mode, in which the speed and/or the power supplied by the engine is not limited.

In the activated mode of the system 110, the truck 100 cannot be driven at a high speed, in particular a speed greater than 30 km/h, or cannot be driven at a long distance, in particular a distance greater than 1 km. This activated mode only permits to a non-authorized user to move the truck 100 in a short-distance parking place or garage when the authorized driver has left the truck without switching-off the engine.

Figure 2:
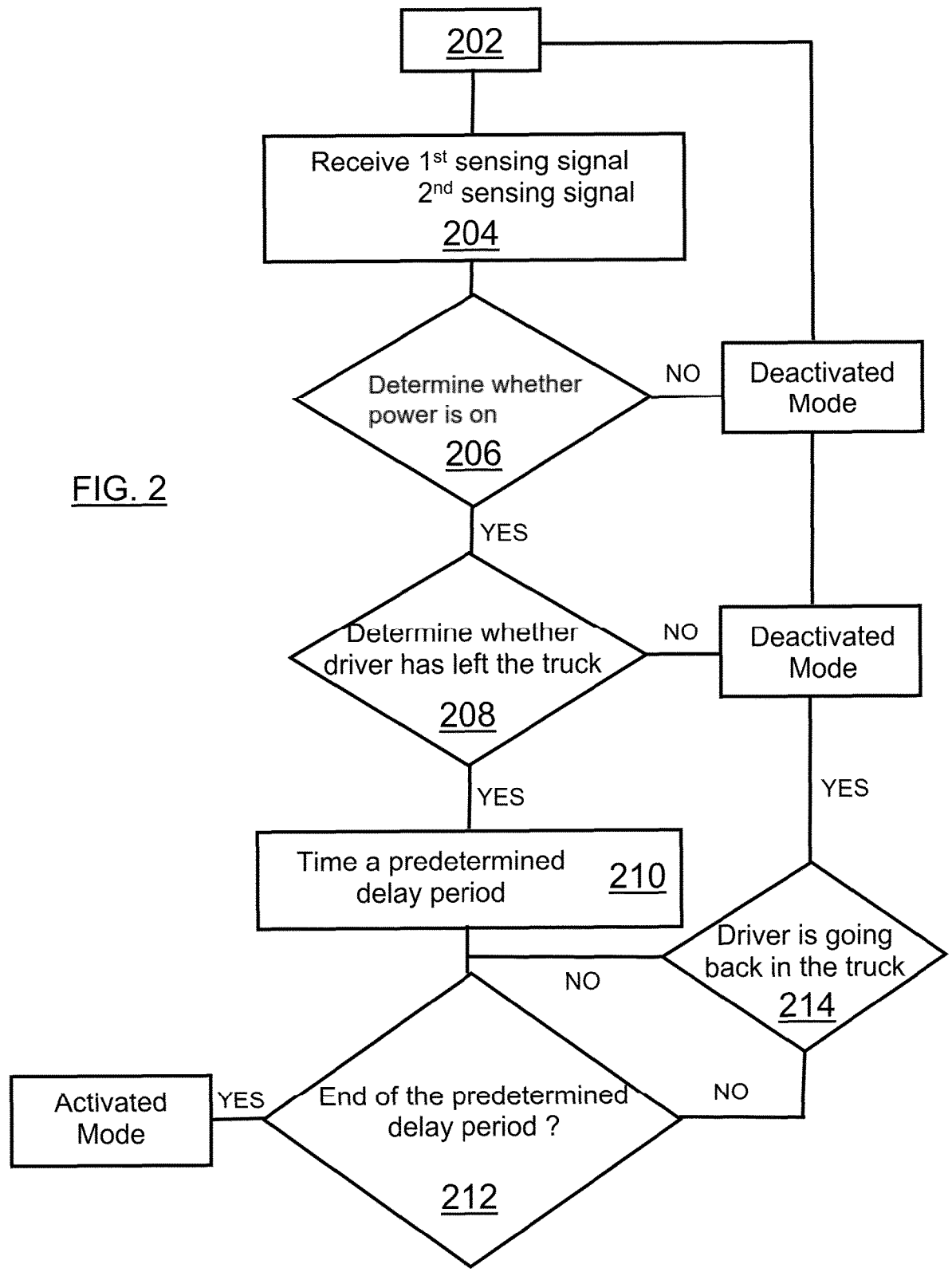
FIG. 2 is a flowchart of an example method for limiting the functionality of the truck illustrated in FIG. 1, when the functionality limiting system is initially in its deactivated mode.

FIG. 2 illustrates a flowchart of an example method for limiting the functionality of the truck 100 illustrated in FIG. 1, when the functionality limiting system 110 is initially in its deactivated mode in a first step 202. At step 204, the control unit 104 may receive a first sensing signal from the first sensor 101 and at least one second sensing signal from the second sensors 102a-102d. In step 206, the control unit 104 may determine whether the power is on based on the first sensing signal. If the control unit 104 determines that the power is off, the deactivated mode is maintained and the method starts again at step 202. If the control unit 104 determines that the power is on, the next step 208 of the method consists to determine whether the driver has left the truck. Thus, the control unit 104 analyses the at least one second sensing signal to determine if at least one, or preferably at least two, operational parameters relative to specific parts of the truck have been changed. For example, the control unit 104 may determine that the park brake of the truck is applied and/or the driver side door of the truck is opened. If the control unit 104 determines that no change occurs in said operational parameters, the deactivated mode is maintained and the method starts again at step 202. If the control unit 104 determines that at least one, or preferably at least two, operational parameters have been changed, the next step 210 consists to time a predetermined delay period via the control unit 104 and, simultaneously, in step 214, to determine whether the driver is going back in the truck. Such a step 214 is similar to the step 208, the control unit 104 determining whether the sensed operational parameters have been changed again to recover their initial value, corresponding to a reference value for the operational parameters. For example, the control unit 104 may determine that the park brake of the truck is loosened again and/or the driver side door of the truck is closed again. If the control unit 104 determines that the driver is going back again before the end of the predetermined delay period, the deactivated mode is maintained and the method starts again at step 202. On the contrary, if the control unit 104 determines that the driver is not going back in the truck at the end of the predetermined delay period, the system 110 is switched to its activated mode. In this activated mode, the speed and/or the power supplied by the engine is limited by the control unit 104 until the system is switched again in its deactivated mode. The predetermined delay period may vary for example between 0 and 120 seconds, preferably between 0 and 60 seconds, and, in particular, may be equal to 10 seconds. Therefore, the motorized vehicle 100 is put in the limited mode if left unoccupied for a predetermined amount of time with power left on without any specific action from the driver. In fact, the motorized vehicle limits itself by itself.

In another embodiment, the system 110 is automatically switched to its activated mode when the control unit 104 senses the passage from the power is off to the power is on. The motorized vehicle is therefore also put in the limited mode when power is just turned on. Once again, the motorized vehicle limits itself by itself. Thus, to use the vehicle, the user has to proceed to a deactivation of the system 110, as detailed in the following paragraph.

Figure 3:
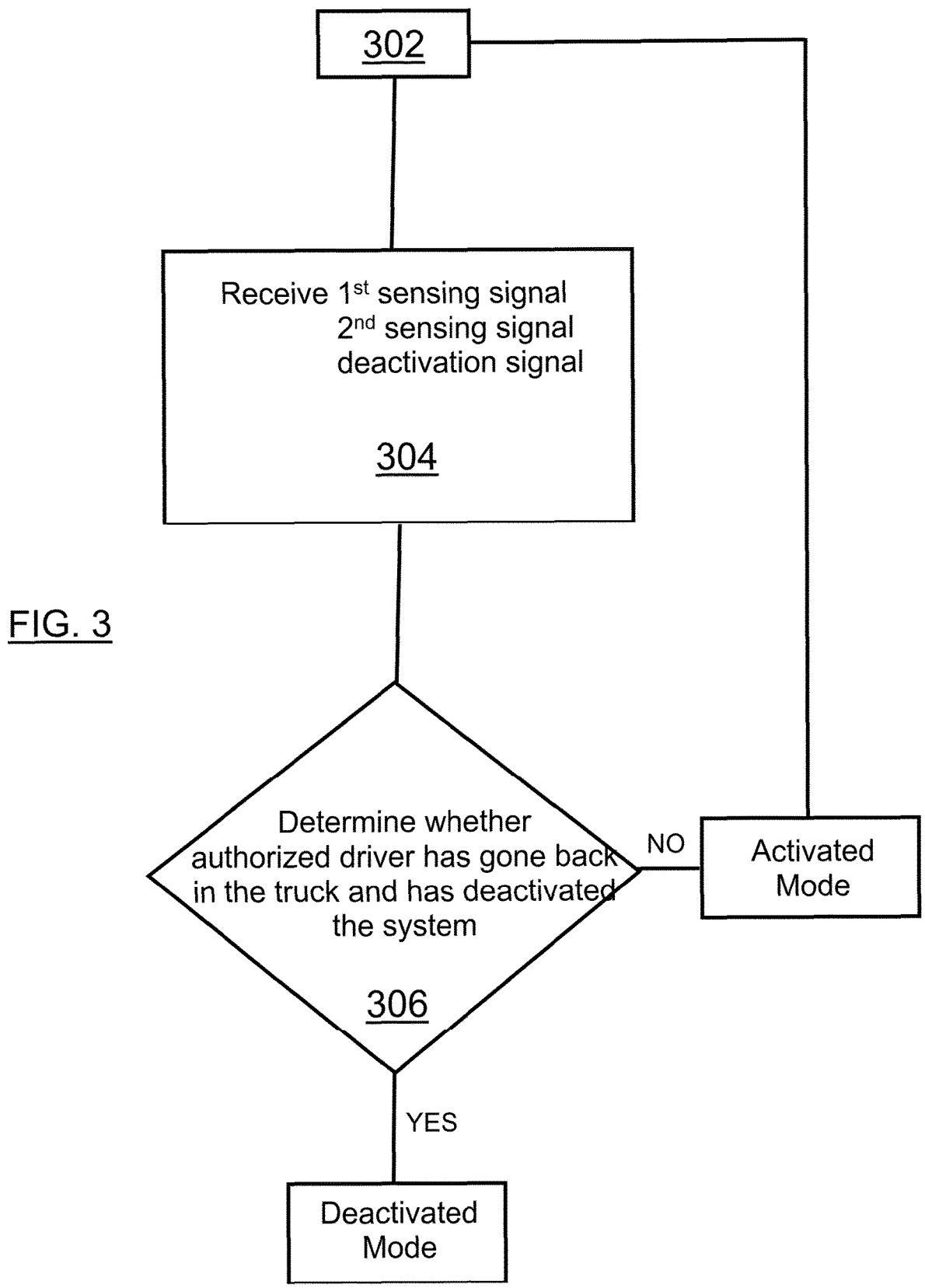
FIG. 3 is a flowchart of an example method for cancelling the limitation of the functionality of the truck illustrated in FIG. 1, when the functionality limiting system is initially in its activated mode.

FIG. 3 illustrates a flowchart of an example method for cancelling the limitation of the functionality of the truck 100 illustrated in FIG. 1, when the functionality limiting system 110 is initially in its activated mode in a first step 302. At step 304, the control unit 104 may receive a first sensing signal from the first sensor 101, at least one second sensing signal from the second sensors 102a-102d and a deactivation signal from the deactivation unit 103. In step 306, the control unit 104 may determine whether the authorized driver has gone back in the truck. In particular, the control unit 104 may analyse the at least one second sensing signal to determine if at least one, or preferably at least two, operational parameters relative to specific parts of the truck have been changed to recover a reference value. For example, the control unit 104 may determine that the park brake of the truck is loosened and/or the driver side door of the truck is closed. Simultaneously, the control unit 104 may determine that a deactivation condition is met based on the deactivation signal transmitted by the deactivation unit 103. For example, the control unit 104 may determine that a predetermined security code is correctly written on a badge or ID card hold by a user. Thus, this user is considered by the system 110 as the authorized driver. Therefore, if the control unit 104 determines that the authorized driver is going back in the truck based on the second sensing signal and the deactivation signal, the system 110 is shifted to its deactivated mode and the method starts again at step 202. On the contrary, if the control unit 104 determines that the driver is not going back in the truck based on the second signal or is not the authorized driver based on the deactivation signal, the system 110 is maintained in its activated mode and the method starts again at step 302.

It is to be understood that the present invention is not limited to the embodiments described above and illustrated in the drawings; rather, the skilled person will recognize that many changes and modifications may be made within the scope of the appended claims.

The invention claimed is:

1. A functionality limiting system for a motorized vehicle provided with a motion system, comprising:
   first sensor means adapted to sense if the power is on and providing a first sensing signal;
   second sensor means adapted to sense one or several operational parameters relative to at least one part of the vehicle and providing a second sensing signal;
   deactivation means adapted to verify if a deactivation condition is met and providing a deactivation signal;
   a control unit in communication with the first and second sensor means and the deactivation means, the control unit receiving said first and second sensing signals and said deactivation signal, the control unit being adapted to control the speed and/or the power supplied by the motion system in response to said first and second sensing signals and said deactivation signal, in such a manner that said speed and/or said power is limited in an activated mode of the system and is not limited in a deactivated mode of the system.

2. The system according to claim 1, characterized in that the at least one part of the vehicle is a door of the vehicle, in particular the driver side door of the vehicle, the second sensor means sensing if said door is opened or closed.

3. The system according to claim 1, characterized in that the at least one part of the vehicle is a seat of the vehicle, in particular the driver seat, the operational parameter sensed by the second sensor means being the pressure applied on the seat.

4. The system according to claim 1, characterized in that the at least one part of the vehicle is a park brake of the vehicle, the second sensor means sensing if the park brake is applied or not.

5. The system according to claim 1, characterized in that the at least one part of the vehicle is a seat belt of the vehicle, the second sensor means sensing if the seat belt is buckled or not.

6. The system according to claim 1, characterized in that the deactivation means are adapted to verify that a predetermined security code is correctly typed on a keypad data entry device by a user.

7. The system according to claim 1, characterized in that the deactivation means are adapted to verify that a predetermined security code is correctly written on a badge or ID card hold by a user.

8. The system according to claim 1, characterized in that the deactivation means are adapted to verify that the facial features of a user correspond to predetermined facial features.

9. The system according to claim 1, characterized in that the deactivation means are adapted to verify that the fingerprints of a user correspond to predetermined fingerprints.

10. The system according to claim 1, characterized in that the control unit is adapted to sense the passage from the power is off to the power is on instantaneously, the system being then directly shifted in its activated mode.

11. The system according to claim 1, characterized in that the control unit is adapted to time a predetermined delay period after the first sensor means sense that the power is on and the second sensor means sense that at least one operational parameter is different from a reference parameter, the system being shifted in its activated mode at the end of the predetermined delay period if, during the predetermined delay period, the second sensor means do not sense that all operational parameters change back to the reference parameter.

12. The system according to claim 11, characterized in that the system is shifted to its deactivated mode after the predetermined delay period, if the second sensor means sense that all operational parameters change back to the reference parameter and the deactivation means verify that the deactivation condition is met.

13. The system according to claim 11, characterized in that the predetermined delay period is between 0 and 120 seconds, preferably between 0 and 60 seconds, and, in particular, is equal to 10 seconds.

14. The system according to claim 11, characterized in that the system is shifted in its activated mode at the end of a predetermined delay period after the first sensor means sense that the power is on and the second sensor means sense that the park brake of the vehicle is applied and the driver side door of the vehicle is opened.

15. The system according to claim 14, characterized in that the system is shifted in its deactivated mode when the first sensor means sense that the power is on, the second sensor means sense that the park brake of the vehicle is not applied and the driver side door of the vehicle as well as all other doors, is closed, and the deactivation means verify that a predetermined security code is correctly typed on a keypad data entry device by a user or written on a badge or ID card hold by a user or facial features of a user correspond to predetermined facial features or fingerprints of a user correspond to predetermined fingerprints.

16. A vehicle comprising a functionality limiting system according to claim 1, the vehicle being preferably a truck.

17. A method for limiting the functionality of a motorized vehicle provided with a motion system, the method comprising the steps of:
   a) providing first sensor means adapted to sense if the power is on and providing a first sensing signal;
   b) providing second sensor means adapted to sense one or several operational parameters relative to at least one part of the vehicle and providing a second sensing signal;
   c) providing deactivation means adapted to verify if a deactivation condition is met and providing a deactivation signal;
   d) providing a control unit in communication with the first and second sensor means and the deactivation means, the control unit receiving said first and second sensing signals and said deactivation signal, the control unit being adapted to control the speed and/or the power supplied by the motion system in response to said first and second sensing signals and said deactivation signal,
   e) sensing, via the first sensor means, if the power is on and transmitting a first sensing signal to the control unit in response to said sensing;
   f) sensing, via the second sensor means, if one or several operational parameters relative to at least one part of the vehicle have been changed and transmitting a second sensing signal to the control unit in response to said sensing;
   g) verifying, via the deactivation means, if a deactivation condition is met and transmitting a deactivation signal to the control unit in response to said verification;
   h) controlling, via the control unit, the speed and/or power supplied by the motion system in response to said first and second sensing signals and said deactivation signal, in such a manner that said speed and/or said power is limited in a first mode and is not limited in a second mode.

18. The method according to claim 17, characterized in that, in step f), the second sensor means sense if at least one door of the vehicle, in particular the driver side door of the vehicle, is opened or closed.

19. The method according to claim 17, characterized in that, in step f), the second sensor means sense if a pressure is applied on the driving seat of the vehicle.

20. The method according to claim 17, characterized in that, in step f), the second sensor means sense if the park brake of the vehicle is applied or not.

21. The method according to claim 17, characterized in that, in step f), the second sensor means sense if a seat belt of the vehicle is buckled or not.

22. The method according to claim 17, characterized in that, in step g), the deactivation means verify that a predetermined security code is correctly typed on a keypad data entry device by a user.

23. The method according to claim 17, characterized in that, in step g), the deactivation means verify that a predetermined security code is correctly written on a badge or ID card hold by a user.

24. The method according to claim 17, characterized in that, in step g), the deactivation means verify that the facial features of a user correspond to predetermined facial features.

25. The method according to claim 17, characterized in that, in step g), the deactivation means verify that the fingerprints of a user correspond to predetermined fingerprints.

26. The method according to claim 17, characterized in that, in step h), when the control unit senses the passage from the power is off to the power is on, the speed and/or the power supplied by the motion system is instantaneously limited.

27. The method according to claim 17, characterized in that the control unit is adapted to time a predetermined delay period after the first sensor means sense that the power is on and the second sensor means sense that at least one operational parameter is different from a reference parameter, the first mode being activated at the end of the predetermined delay period if, during the predetermined delay period, the second sensor means do not sense that each of said at least one operational parameter changes back to the reference parameter.

28. The method according to claim 27, characterized in that the first mode is shifted to the second mode after the predetermined delay period, if the second sensor means sense that each of said at least one operational parameter changes back to the reference parameter and the deactivation means verify that the deactivation condition is met.

29. The method according to claim 27, characterized in that the predetermined delay period is between 0 and 120 seconds, preferably between 0 and 60 seconds, and, in particular, is equal to 10 seconds.

30. The method according to claim 27, characterized in that the control unit limits the speed and/or power supplied by the motion system at the end of a predetermined delay period after the first sensor means sense that the power is on and the second sensor means sense that the park brake of the vehicle is applied and the driver side door of the vehicle is opened.

31. The method according to claim 30, characterized in that the control unit cancels the limitation of the speed and/or power supplied by the motion system when the first sensor means sense that the power is on, the second sensor means sense that the park brake of the vehicle is not applied and the driver side door of the vehicle, as well as all other doors, is closed, and the deactivation means verify that a predetermined security code is correctly written on a badge or ID card hold by a user.

* * * * *